United States Patent
Dudar

(10) Patent No.: US 10,124,731 B2
(45) Date of Patent: Nov. 13, 2018

(54) CONTROLLING SIDE-VIEW MIRRORS IN AUTONOMOUS VEHICLES

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 21 days.

(21) Appl. No.: 15/260,564

(22) Filed: Sep. 9, 2016

(65) Prior Publication Data

US 2018/0072230 A1    Mar. 15, 2018

(51) Int. Cl.
*B60R 1/00* (2006.01)
*B60S 1/56* (2006.01)
*G05D 3/10* (2006.01)
*G01F 9/02* (2006.01)

(52) U.S. Cl.
CPC ............... *B60R 1/006* (2013.01); *B60S 1/56* (2013.01); *G01F 9/023* (2013.01); *G05D 3/10* (2013.01); *B60Y 2300/52* (2013.01)

(58) Field of Classification Search
USPC ............ 701/36, 48, 49, 50; 359/841, 843; 180/903
See application file for complete search history.

(56) References Cited

U.S. PATENT DOCUMENTS

| | | | |
|---|---|---|---|
| 4,810,022 A * | 3/1989 | Takagi | B62D 35/005 180/197 |
| 7,594,732 B2 * | 9/2009 | Kia | B60R 1/082 359/841 |
| 8,285,457 B1 * | 10/2012 | Askew | B60R 1/0612 359/841 |
| 9,216,689 B2 | 12/2015 | Meadows | |
| 2009/0018730 A1 * | 1/2009 | Tarasinski | A01D 41/127 701/50 |
| 2009/0248242 A1 * | 10/2009 | Cohen | B62D 37/02 701/36 |
| 2011/0137514 A1 * | 6/2011 | Itabashi | B60W 10/06 701/31.4 |
| 2012/0185135 A1 * | 7/2012 | Sheriff | B60W 50/082 701/48 |

(Continued)

FOREIGN PATENT DOCUMENTS

| | | |
|---|---|---|
| DE | 3839322 A1 | 5/1990 |
| DE | 102012003561 A1 | 8/2013 |
| WO | 0246000 A1 | 6/2002 |

OTHER PUBLICATIONS

Search Report from United Kingdom Intellectual Property Office dated Feb. 13, 2018 regarding GB Application No. 1714310.8 (5 pages).

*Primary Examiner* — Richard A Goldman
(74) *Attorney, Agent, or Firm* — Frank A. MacKenzie; Bejin Bieneman PLC

(57) ABSTRACT

Side-view mirror deployment in autonomous vehicles can be diagnosed by determining one or more first rates of fuel consumption and deploying one or more side-view mirrors. One or more second rates of fuel consumption can then be determined and one or more deployment states of the side-view mirror can be controlled based on the first rates of fuel consumption and the second rates of fuel consumption.

20 Claims, 7 Drawing Sheets

(56) References Cited

U.S. PATENT DOCUMENTS

| | | | |
|---|---|---|---|
| 2013/0079984 A1* | 3/2013 | Aerts | E05B 85/103 |
| | | | 701/36 |
| 2015/0002952 A1 | 1/2015 | Castillo | |
| 2015/0006041 A1* | 1/2015 | Froling | G05D 3/10 |
| | | | 701/49 |
| 2015/0165975 A1 | 6/2015 | Meadows | |
| 2015/0175168 A1 | 6/2015 | Hoye et al. | |
| 2015/0253536 A1* | 9/2015 | Le | B60R 1/006 |
| | | | 701/49 |

* cited by examiner

CONTROLLING SIDE-VIEW MIRRORS IN AUTONOMOUS VEHICLES

BACKGROUND

Vehicles can be equipped to operate in both autonomous and occupant-piloted mode. While operating in autonomous mode, an array of sensors can be used to pilot the vehicle and side-view mirrors are therefore not necessary. Deploying side-view mirrors into a position closer to or within the body of a vehicle during autonomous operation can reduce aerodynamic drag and thereby reduce the rate of fuel consumption.

DETAILED DESCRIPTION

Deploying side-view mirrors into a position that offers improved aerodynamics during autonomous vehicle operation can decrease the rate of fuel consumption and thereby improve fuel economy by reducing aerodynamic drag. Side-view mirrors can be defined as mechanical, for example mirror-based or electrical, for example video-based devices attached externally to the body of a vehicle to assist an occupant driver in piloting the vehicle by providing views of areas around the vehicle.

Deploying side-view mirrors can be defined as positioning, moving, adjusting, folding, unfolding, contracting, extending or in any manner whatsoever changing position of a side-view mirror with respect to the body of a vehicle to which they are attached. Positioning or folding side-view mirrors so as to reduce aerodynamic drag can be defined as being in the "not deployed" state. Deploying side-view mirrors into a correct position for occupant piloting can be defined as being in the "deployed" state. Deploying side-view mirrors into any other position than "deployed" or "not deployed" is defined as being in the "incorrectly deployed" state.

Deploying side-view mirrors into an improved aerodynamic position should only occur when the vehicle is in autonomous operation. Since no occupant is required for autonomous operation, observation by an occupant is not a reliable way to diagnose deployment state. Deployment state can be partly detected by stall current detection. Stall current detection is a current-based technique that can detect an increase in electrical current caused by electrical actuators including motors or solenoids, for example, reaching a limit of travel.

Stall detection can be indicative of but not dispositive of the actual deployment state of a side-view mirror. Stall detection indicates that a stall current has been generated by the side-view mirror, but does not indicate what deployment state the side-view mirror was actually in when the stall current was generated. Examination of the timing associated with the stall current can be more informative, but still does not provide definitive information regarding the deployment state of the side-view mirror. However, combining stall detection with first and second rates of fuel consumption can improve the accuracy of side-view mirror deployment diagnosis.

Figure 1:
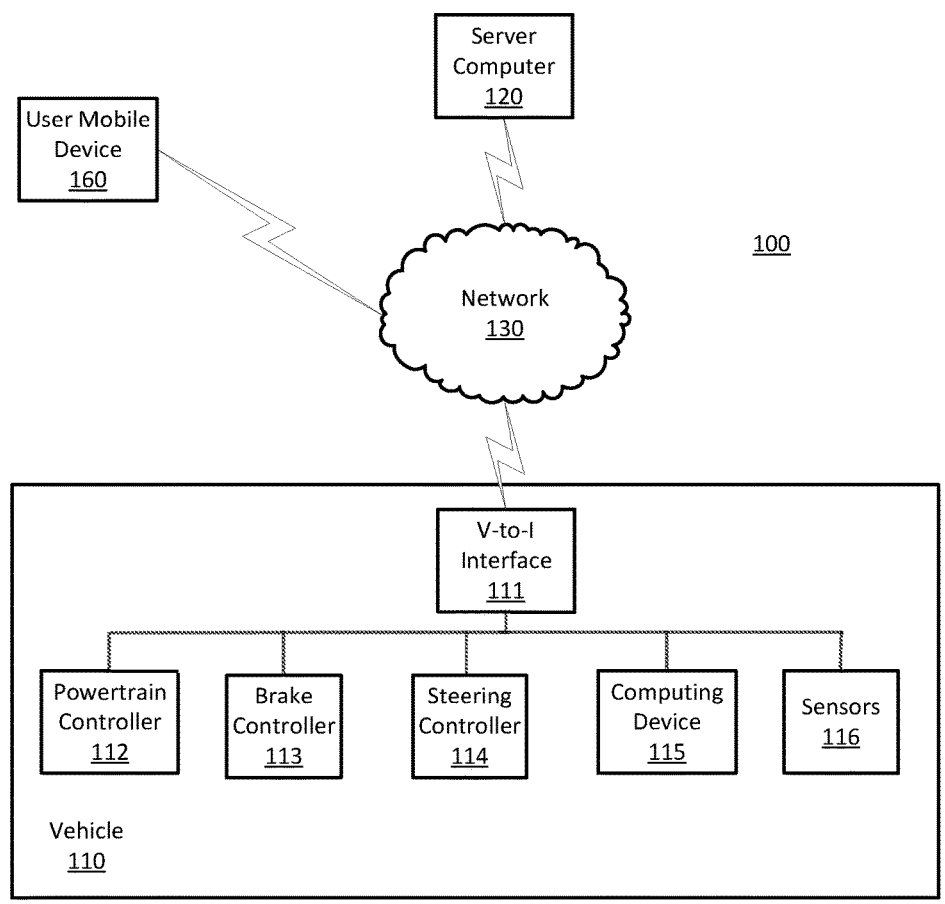
FIG. 1 is a diagram of an example of a vehicle operable in autonomous and occupant-piloted mode.

FIG. 1 is a diagram of a vehicle information system 100 that includes a vehicle 110 operable in autonomous and occupant-piloted mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130. The V-to-I interface 111, as described below, may utilize various wired and/or wireless networking technologies, e.g., cellular, BLUETOOTH® and wired and/or wireless packet networks. The computing device 115 also includes nonvolatile memory such as are known. Computing device can log information by storing the information in nonvolatile memory for later retrieval and transmittal via the vehicle communication network and V-to-I interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide a geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include e.g., altimeters, cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 6:
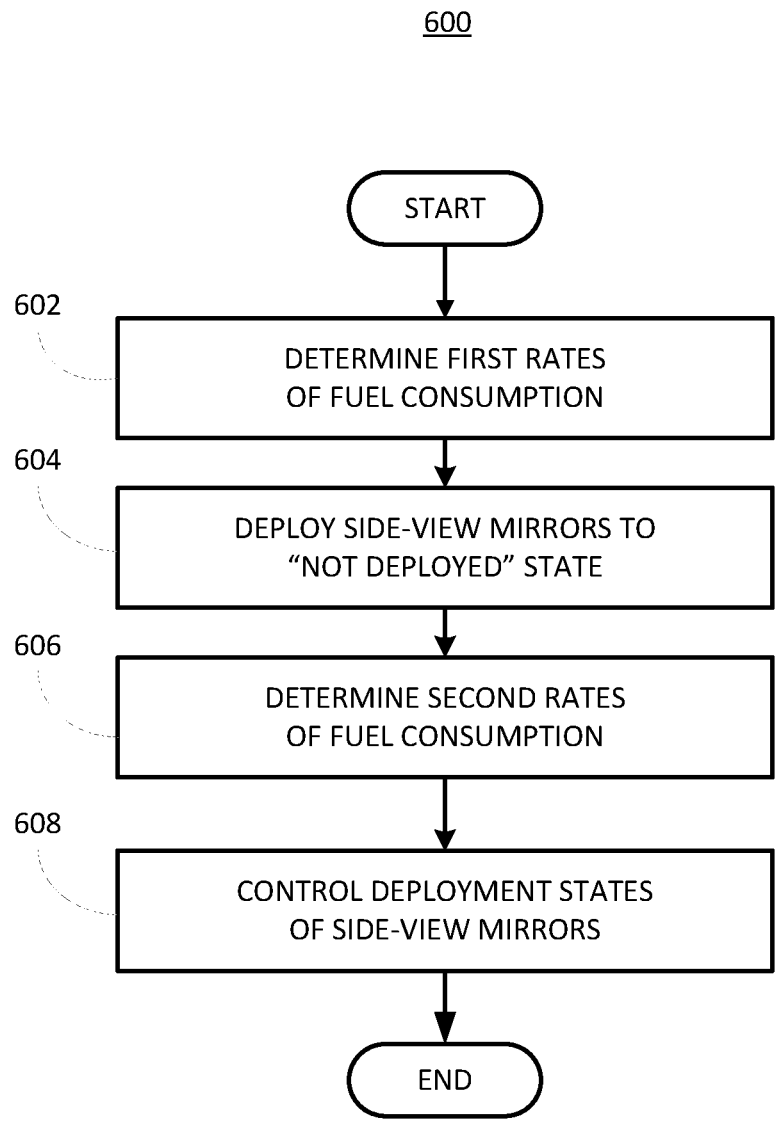
FIG. 6 is a flowchart diagram of an example process to control side-view mirror deployment.

FIG. 6 is a flowchart diagram of a process 600 for controlling side-view mirrors. Process 600 can be performed by a processor associated with computing device 115 of vehicle information system 100, inputting information from sensors 116 and sending control signals via controllers 112, 113, 114, for example. Process 600 includes multiple steps taken in the disclosed order. Process 600 also includes implementations including fewer steps or the steps taken in different orders.

At the start of process 600, a vehicle 110 is in autonomous mode of operation, being piloted by computing device 115 in cooperation with sensors 116 and controllers 112, 113, 114 as described above in relation to FIG. 1, above, for example. Computing device 115 can recall the information that this state of autonomous operation follows vehicle 110 having been in a state of occupant piloted operation. This can mean that side-view mirrors 202, 302, 402, 502 are in a "deployed" state, since this is the state into which occupants deploy side-view mirrors into while piloting vehicle 110. Nonvolatile memory associated with computing device 115 can record and store information regarding the state of the vehicle and recall this information at the start of process 600.

Figure 2:
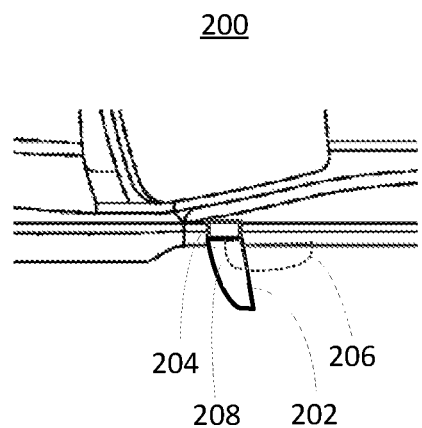
FIG. 2 is a diagram of an example of a deployed vehicle side-view mirror.

The deployment state of side-view mirrors 202, 302, 402, 502 can be understood with reference to FIGS. 2, 3, 4 and 5. FIG. 2 is a diagram of a section of a vehicle 200 including a side-view mirror 202 in "deployed" state mounted on a mount 204. The purpose of the mount 204 is to securely fix the side-view mirror 202 in "deployed" state to the vehicle 200. In some implementations the "deployed" 202 side-view mirror is connected directly to vehicle 200 without a mount 204. Side-view mirror can be in "not deployed" state 206. Side-view mirror 202 can be deployed into "not deployed" state 206 from "deployed" state by deployment mechanism 208.

Deployment mechanism 208 can include hinges, sliding sections, flexible couplings or the like, and can be actuated electrically, hydraulically or pneumatically, for example under control of computing device 115 by control signals sent by computing device 115 via controllers 112, 113, 114. Deployment mechanism 208 can be a separate device or constructed as a part of side-view 202 mirror in "deployed" or "not deployed" state 206.

Process 600 can start at step 602, where first rates of fuel consumption are determined by computing device 115 with input from sensors 116. In addition to information regarding fuel consumption, computing device 115 can also input information regarding the vehicle's speed and the operating state of the vehicle. Fuel consumption is the rate at which fuel is being consumed by the vehicle. Fuel can be liquid petroleum- or alcohol-based products, liquefied gasses or electricity, for example. The operating state of the vehicle can include engine temperature, throttle position and environmental variables such as external temperature, for example.

Computing device 115 can determine, as part of the operating state of the vehicle, the state of the terrain over which the vehicle is traveling. The state of the terrain should be flat and level while computing device 115 performs process 600 in order to make the first and second rates of fuel consumption comparable. The terrain can be required to be at predetermined levels of flatness and grade within predetermined tolerances while computing device determines first and second rates of fuel consumption, for example.

Flatness and grade can be determined by computing device 115 by inputting signals representing the location and pose of vehicle 110 from sensors 116 including inertial pose sensors and GPS sensors, for example. Flatness can be defined as a measure associated with motion of one or more parts of vehicle 110 in directions perpendicular to the direction of travel as the vehicle travels over terrain, e.g. roads. Flatness can be a measure of the roughness of the road, for example.

Grade can be determined by a measure of the change in altitude associated with the terrain, e.g. the rate at which the road rises or falls as the vehicle 110 travels. Grade can be measured with an inertial pose sensor 116 or with external information from a GPS sensor 116 to determine altitude and thereby grade by sampling altitude over time as vehicle 110 travels over terrain.

Process 600 records information regarding vehicle speed and operating state when determining first rates of fuel consumption and stores this information at computing device 115. This information can be stored to be later combined with similar information input at step 606, when process 600 determines second rates of fuel consumption.

Figure 3:
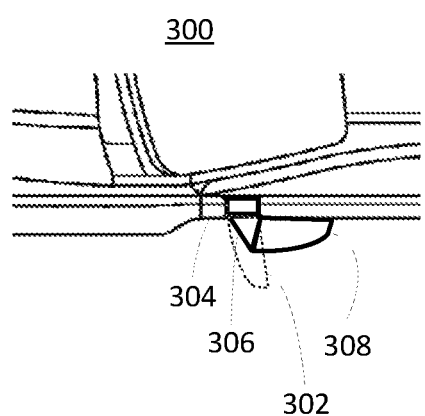
FIG. 3 is a diagram of another example of a deployed vehicle side-view mirror.

At step 604, process 600 can deploy side-view mirrors 202, 302, 402, 502 from the "deployed" state to the "not deployed" state. FIG. 3 is a diagram of a side-view mirror 308 (dotted lines) in a "not deployed" state mounted on deployment mechanism 306 attached to a mount 304. Side-view mirror 308 in "deployed" state is shown in dotted lines. Deployment mechanism 306 can be mounted directly on vehicle without mount 304. Deployment mechanism 306 can include one or more of hinges, sliding sections or flexible couplings and the like and can be actuated by one or more of electrical, hydraulic or pneumatic actuators, for example under control of computing device 115 by control signals sent by computing device 115 via controllers 112, 113, 114. Deployment mechanism 306 can be a separate device or constructed as a part of side-view mirror 302.

Figure 4:
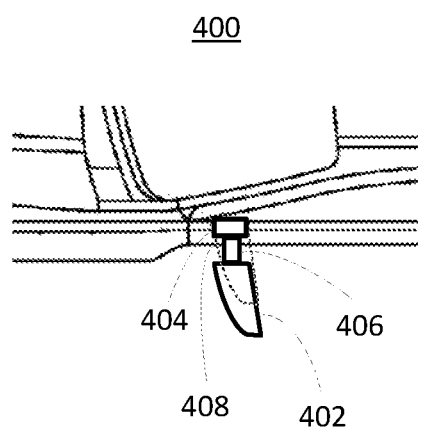
FIG. 4 is a diagram of another example of a deployed vehicle side-view mirror.

FIG. 4 is a diagram of a side-view mirror 402 in the "deployed" state mounted on a deployment mechanism 406 attached to a mount 404. Side-view mirror 408 in the "not deployed" state is shown in dotted lines. Deployment mechanism 406 can be mounted directly on vehicle 400 without mount 404. Side-view mirror 402 can be positioned in the "not deployed" state without a separate deployment mechanism 406. Deployment mechanism 406 can include one or more of hinges, sliding sections or flexible couplings and can be actuated by one or more of electrical, hydraulic or pneumatic actuators and the like, for example under control of computing device 115 by control signals sent by computing device 115 via controllers 112, 113, 114. Deployment mechanism 406 can be a separate device or constructed as a part of side-view mirror in "deployed" 308 or "not deployed" 302 state.

Side-view mirror 402 can be slideably connected to deployment mechanism 406 whereby side-view mirror is deployed to the "deployed" state by extending the side-view mirror 402 out from the vehicle 400 and deployed to the "not deployed" state by contracting the side-view mirror 408 in dotted line in towards the vehicle.

Figure 5:
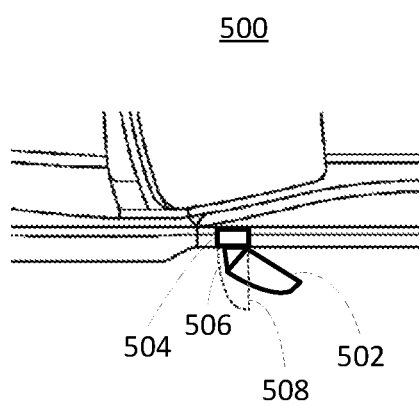
FIG. 5 is a diagram of another example of a deployed vehicle side-view mirror.

FIG. 5 is a diagram of a side-view mirror 502 deployed in an "incorrectly deployed" state, deployed at an angle to mount 504 and vehicle 500 by deployment mechanism 506. FIG. 5 also shows side-view mirror 508 (dotted lines) in "correctly deployed" state. Side-view mirror 502 can be attached to vehicle 500 without mount 504 and separate deployment mechanism 506. Deployment mechanism 506 can include one or more of hinges, sliding sections or flexible couplings and can be actuated by one or more of electrical, hydraulic or pneumatic actuators and the like, for example under control of computing device 115 by control signals sent by computing device 115 via controllers 112, 113, 114.

Side-view mirror 502 is deployed in an "incorrectly deployed" deployment state can include being deployed at an angle with respect to the vehicle 500 that is between the angle of a side-view mirror 508 in "deployed" state with respect to the vehicle 500 and the angle of a side-view mirror 302 in "not deployed" state with respect to the vehicle 500, for example. Measuring the difference in rates of fuel consumption before and after deploying side-view mirror 502 can indicate the angle of the side-view mirror 502 in an "incorrectly deployed" state with respect to vehicle 500 by comparing the difference to a predetermined value D by computing device 115.

Deployment mechanisms 306, 406, 506 can be controlled by computing device 115 via a controller that sends control signals to side-view mirrors 202, 302, 402, 502 that command the deployment mechanisms 306, 406, 506 to deploy the side-view mirrors 202, 302, 402, 502 to desired deployment states. Deployment mechanisms 306, 406, 506 can measure and record stall current while deploying side-view mirrors 202, 302, 402, 502, for example.

Timing and other characteristics of recorded stall currents can form current-based estimates of deployment state. For example, if side-view mirrors 202, 302, 402, 502 receive a control signal from computing device 115 including a command to deploy to the "not deployed" state, when the deployment occurs as expected, deployment mechanisms 306, 406, 506 can record stall currents of a predetermined time and predetermined amounts, indicating that the actuator effecting the deployment ran for the expected time and ended at an expected stop. This information can be used by computing device 115 as one indication that the side-view mirrors 202, 302, 402, 502 can be correctly deployed.

Returning to FIG. 6, at step 2 process 600 deploys side-view mirrors 202, 302, 402, 502 to the not deployed state. This can be performed by computing device 115 sending control signals to side-view mirrors 202, 302, 402, 502 As shown in FIGS. 3 and 4, this can include slideably or foldably deploying the side-view mirrors 202, 302, 402, 502 closer to the vehicle 200, 300, 400, 500 to reduce. aerodynamic drag. Deploying the side-view mirrors can occur without separate deployment mechanisms 306, 406, 506 or mounts 204, 304, 404, 504 respectively. Side-view mirrors 202, 302, 402, 502 can be slid or folded completely within and flush with the surface of the vehicle 200, 300, 400, 500, for example, to completely eliminate aerodynamic drag when in the "not deployed" state.

At step 606 process 600 second rates of fuel consumption are determined by computing device 115 with input from sensors 116. In addition to information regarding fuel consumption, computing device 115 can also record information regarding the vehicle's speed and operating state. This information can be compared to similar information recorded at step 602, when process 600 determined first rates of fuel consumption. Vehicle speed and operating state are compared to ensure that the first and second fuel consumption rates were measured under the same conditions and therefore represent an accurate comparison.

Figure 7:
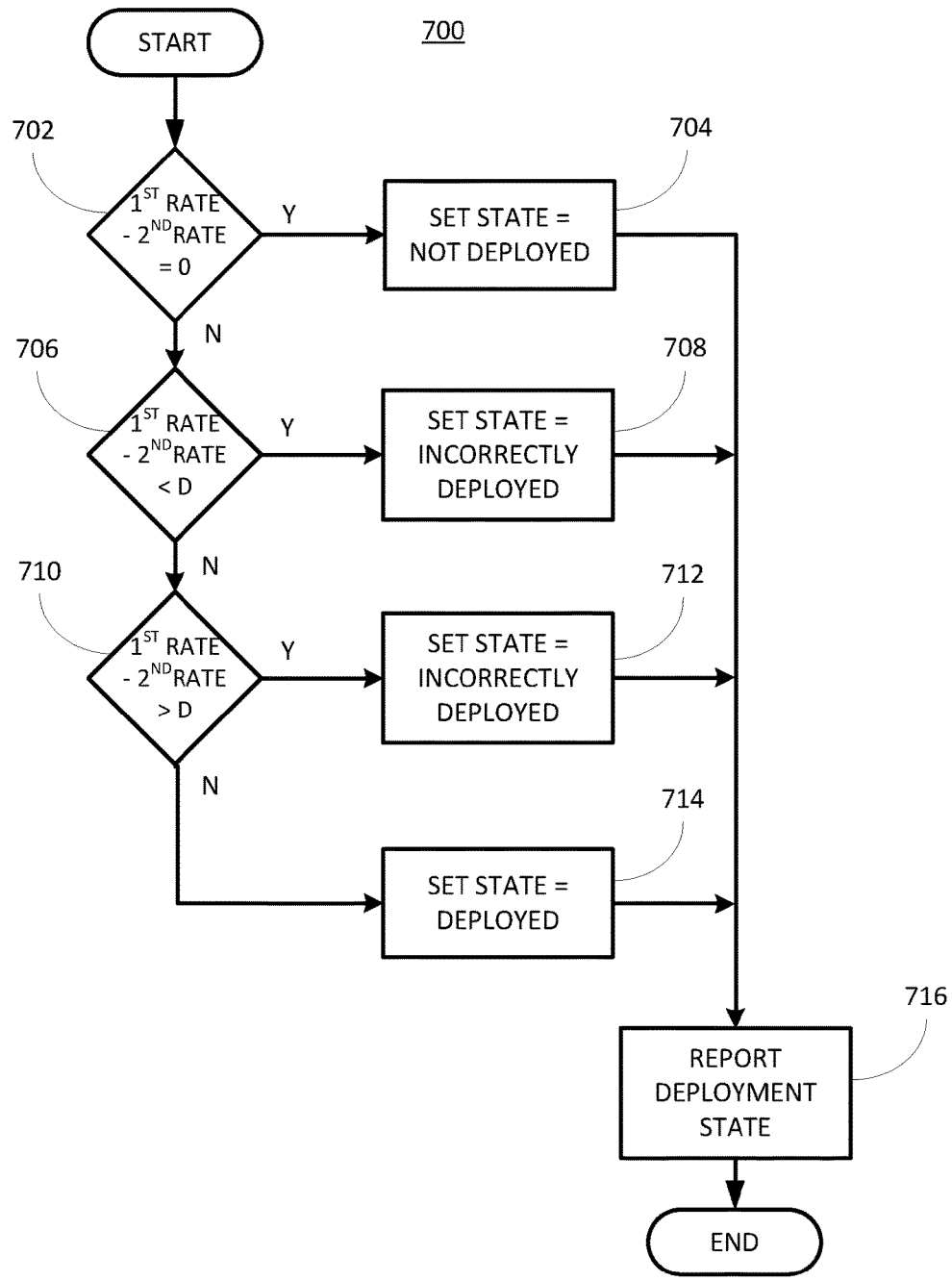
FIG. 7 is a flowchart diagram of an example process to control side-view mirror deployment.

At step 608 process 600 controls deployment states of side-view mirrors 202, 302, 402, 502 by first determining the deployment state of the side-view mirrors 202, 302, 402, 502 by comparing the first rates of fuel consumption to the second rates of fuel consumption. FIG. 7 is a flowchart diagram that describes step 608 in more detail.

FIG. 7 is a flowchart diagram of a process 700 for controlling deployment states of side-view mirrors according to aspects of disclosed implementations. Process 700 can be implemented on one or more processors associated with computing device 115 of vehicle information system 100, inputting information from sensors 116 and sending control signals via controllers 112, 113, 114, for example. Process 700 includes multiple steps taken in a certain order. Process 600 includes multiple steps taken in the disclosed order. Process 600 also includes implementations including fewer steps or the steps taken in different orders.

At step 702 first and second rates of fuel consumption can be subtracted from one another. Second rates of fuel consumption can be subtracted from respective first rates of fuel consumption or first and second rates of fuel consumption can be respectively compared or combined using averaging into two rates that can be compare. First rates of fuel consumption and second rates of fuel consumption can be filtered to form two or more values that can be compared.

Filtering can include averaging rates of fuel consumption over time to reduce the effect of signal noise and improve the accuracy of the consumption rate measurement, for example. Filtering the rates of fuel consumption can include acquiring multiple measurements at predetermined time intervals and averaging the measurements using a moving window, or boxcar-type filter, for example.

At step 702 second rates of fuel consumption are combined by averaging or filtering to form a single value that is subtracted from a single value formed by combining first rates of fuel consumption using averaging or filtering to form a rate difference. If the rate difference is equal to zero, deploying the side-view mirrors 202, 302, 402, 502 to the not deployed state did not change the aerodynamics of the vehicle 200, 300, 400, 500 and therefore no measurable change in fuel consumption rate was measured and control passes to step 704. At step 704 process 600 can determine that since the rates of fuel consumption did not change, computing device 115 can conclude that the side-view mirrors 202, 302, 402, 502 did not change deployment from "deployed" state to "not deployed" and therefore the deployment state remains "deployed".

If the computing device were not certain of the previous state of vehicle 110 and wanted to determine if the side-view mirrors 202, 302, 402, 502 are in the "not deployed" state both before and after being commanded to deploy to the "not deployed" state, computing device 115 can command the side-view mirrors 202, 302, 402, 502 to deploy to the "deployed" state, determine third rates of fuel consumption, command the side-view mirrors 202, 302, 402, 502 to re-deploy to the "not deployed" state and determine fourth rates of fuel consumption. The third and fourth rates of fuel consumption can be compared to the first and second rates of fuel consumption to determine the deployment state of the side-view mirrors 202, 302, 402, 502.

Process 600 can also compare the first rates of fuel consumption and the second rates of fuel consumption to a predetermined value to determine if they are consistent with side-view mirrors 202, 302, 402, 502 in the "deployed" state or "not deployed" state. The value can be predetermined by determining rates of fuel consumption at vehicle speeds and operating states similar to the vehicle speed and operating states at which the first and second rates of fuel consumption are determined, for example.

In other aspects of disclosed implementations, stall current can be detected and compared to predetermined values. In the case where first and second rates of fuel consumption are identical, current-based techniques such as stall current detection can indicate within which deployment state the side-view mirrors 202, 302, 402, 502 are.

If the first rates of fuel consumption are not equal to the second rates of fuel consumption, control passes to step 706 where the rate difference is compared to a predetermined value D. The predetermined value D can be determined by computing device 115 from original programming information and modified by experience, for example. If the rate difference is less than D, control passes to step 708 where the deployment state is set equal to "incorrectly deployed" and control passed to step 716. This state, along with a rate difference less than D can indicate a side-view mirror 202, 302, 402, 502 deployed at an angle similar to side-view mirror 508, or partly extended for example.

If the rate difference is not less than D, control passes to step 710, where the rate difference is compared to D again, and if the rate difference is greater than D, control passes to step 712 where the deployment state is set to "incorrectly deployed" and control passes to step 716. This state, along with a rate difference greater than D, can indicate icing of the side-view mirrors 202, 302, 402, 502, for example. The computing device 115 can combine the rate difference with other information from sensors 116 such as temperature and humidity to detect icing wherein ice deposits can build up on side-view mirrors 202, 302, 402, 502 due to winter weather conditions, for example.

If control passes to step 714, the rate difference is equal to D, and at step 714 the deployment state can be set to "not deployed", since the difference between the first rates of fuel consumption and the second rates of fuel consumption is equal to the expected change in fuel consumption caused by deploying the side-view mirrors 202, 302, 402, 502 from "deployed" to "not deployed". Control then passes to step 716.

At step 716 the deployment state is reported to computing device 115. Computing device 115 can control side-view mirrors based on the deployment state. For example, computing device 115 can determine, based on the reported deployment state, if the side-view mirrors 202, 302, 402, 502 is in a predetermined desired state. If the reported deployment state is different than a predetermined desired state, computing device 115 can send control signals to side-view mirrors 202, 302, 402, 502 to command the side-view mirrors 202, 302, 402, 502 to deploy to the desired deployment state.

For example, if the deployment state determined by the first and second fuel consumption rates is "deployed", and "not deployed" was the desired state, computing device can send control signals to the side-view mirrors 202, 302, 402, 502 to deploy to the "not deployed" state as a corrective action. If the side-view mirrors 202, 302, 402, 502 are unable to deploy to the desired state, computing device 115 can log the event and the reported deployment state in non-volatile memory for later recovery by a diagnostic process, for example. Depending upon the reported deployment state and the desired deployment state, computing device 115 can determine if corrective action is required and send control signals to perform the corrective action to side-view mirrors 202, 302, 402, 502, for example. Computing device 115 can also log the event and the reported deployment state in nonvolatile memory, for example, and send the event and reported deployment state to a server computer 120 or user mobile device 160 via a network 130 for review and possible intervention, for example.

If the deployment state reported to the computing device 115 is "incorrectly deployed" and the rate difference is greater than D, computing device 115 can determine that the side-view mirrors 202, 302, 402, 502 are iced, meaning that winter weather conditions have caused snow and ice, for example, to accumulate on the side-view mirrors 202, 302, 402, 502 as the vehicle 110 is piloted. Accumulating snow and ice can cause an increase in fuel consumption rate that can be reported to computing device 115. Computing device 115 can in this case take corrective action including heating, moving, expanding or vibrating the side-view mirrors 202, 302, 402, 502 to control deicing when side-view mirrors 202, 302, 402, 502 are determined to be iced.

Summarizing FIG. 7, computing device 115 can determine the deployment state of side-view mirrors 202, 302, 402, 502 based on the first and second rates of fuel consumption. Computing device can control the side-view mirrors 202, 302, 402, 502 based on the deployment state at steps 702, 706 and 710 including setting the deployment state at steps 704, 708, 712 and 714 and reporting the deployment state at step 716 to computing device 115. Computing device 115 can log the deployment state in non-volatile memory and send the deployment state to a server computer 120 or user mobile device 160.

Returning to FIG. 6, in summary process 600 can determine the deployment state of side-view mirrors 202, 302, 402, 502 based on determining first rates of fuel consumption, deploying the side-view mirrors 202, 302, 402, 502 to a desired position, determining second rates of fuel consumption and comparing first and second rates of fuel consumption. Determining the deployment states of the side-view mirrors 202, 302, 402, 502, permits computing device 115 to control the deployment state of side-view mirrors 202, 302, 402, 502.

Vehicle 110 can have two side-view mirrors 202, 302, 402, 502, a first side-view mirror 202, 302, 402, 502 for the driver's side, and a second side-view mirror 202, 302, 402, 502 for the passenger's side. Computing device 115 according to the processes 600 and 700 can control the deployment states of both first side-view mirror and second side view mirror individually to determine which one is incorrectly deployed. Computing device can deploy first and second side-view mirrors 202, 302, 402, 502 in sequence, measuring first and second rates of fuel consumption for each deployment.

By deploying first and second side-view mirrors 202, 302, 402, 502 in the same sequence, comparable values for first and second rates of fuel consumption can be determined for each side-view mirror 202, 302, 402, 502 deployment. Different values of D, as discussed above in relation to FIG. 7, can be predetermined for first and second side-view mirror 202, 302, 402, 502 deployments, for example. In this fashion computing device 115 can control the deployment states of both driver's and passenger's side-view mirrors 202, 302, 402, 502 individually, and therefore be able to take appropriate corrective action or log events and reported deployment states in nonvolatile memory, for example, and send the events and reported deployment states to a server computer 120 or user mobile device 160 via a network 130 for review and possible intervention, for example.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention

I claim:

1. A method, comprising:
    determining one or more first rates of vehicle fuel consumption in a vehicle computer;
    deploying, by the computer, a side-view mirror;
    then determining in the computer one or more second rates of vehicle fuel consumption; and
    controlling, by the computer, one or more deployment states of the side-view mirror based on the first rates of vehicle fuel consumption and the second rates of vehicle fuel consumption.

2. The method of claim 1 wherein the deployment states include one or more of deployed, not deployed and incorrectly deployed.

3. The method of claim 1 wherein the first rates of vehicle fuel consumption and the second rates of vehicle fuel consumption are determined at respective predetermined vehicle speeds.

4. The method of claim 1 wherein the first rates of vehicle fuel consumption and the second rates of vehicle fuel consumption are determined under respective predetermined vehicle operating conditions.

5. The method of claim 1 wherein the one or more first rates of vehicle fuel consumption are combined to form one or more filtered first rates of vehicle fuel consumption.

6. The method of claim 1 wherein the one or more second rates of vehicle fuel consumption are combined to form one or more filtered second rates of vehicle fuel consumption.

7. The method of claim 1 wherein the first rates of vehicle fuel consumption and the second rates of vehicle fuel consumption are compared to determine one or more of deployed, not deployed and incorrectly deployed deployment states of the side-view mirror.

8. The method of claim 1 further comprising:
    upon at least determining that a difference between the first rates of vehicle fuel consumption and the second rates of vehicle fuel consumption exceeds a threshold, and that a current deployment state is an incorrectly deployed deployment state, initiating a deicing action.

9. The method of claim 2 further comprising:
    controlling deployment angles of the side-view mirror based on the first rates of vehicle fuel consumption and the second rates of vehicle fuel consumption when the deployment states are incorrectly deployed.

10. The method of claim 1 further comprising:
    determining one or more current-based deployment states for the side-view mirror; and
    controlling deployment states of the side-view mirror based on the first rates of vehicle fuel consumption, the second rates of vehicle fuel consumption and the current-based deployment states.

11. An apparatus, comprising:
    a processor; and
    a memory, the memory storing instructions executable by the processor to:
    determine one or more first rates of vehicle fuel consumption;
    deploy a side-view mirror;
    then determine one or more second rates of vehicle fuel consumption; and
    control one or more deployment states of the side-view mirror based on the first rates of vehicle fuel consumption and the second rates of vehicle fuel consumption.

12. The apparatus of claim 11 wherein the deployment states include one or more of deployed, not deployed, and incorrectly deployed.

13. The apparatus of claim 11 further comprising instructions to:
    determine the first rates of vehicle fuel consumption and the second rates of vehicle fuel consumption at respective predetermined vehicle speeds.

14. The apparatus of claim 11 wherein the first rates of vehicle fuel consumption and the second rates of vehicle fuel consumption are determined under respective predetermined vehicle operating conditions.

15. The apparatus of claim 11 further comprising instructions to:
    combine the one or more first rates of vehicle fuel consumption to form one or more filtered first rates of fuel consumption.

16. The apparatus of claim 11 further comprising instructions to:
    combine the one or more second rates of vehicle fuel consumption to form one or more filtered second rates of vehicle fuel consumption.

17. The apparatus of claim 11 further comprising instructions to:
    compare the first rates of vehicle fuel consumption and the second rates of vehicle fuel consumption to determine one or more of deployed, not deployed and incorrectly deployed deployment states of the side-view mirror.

18. The apparatus of claim 11 further comprising instructions to:
    upon at least determining that a difference between the first rates of vehicle fuel consumption and the second rates of vehicle fuel consumption exceeds a threshold, and that a current deployment state is an incorrectly deployed deployment state, initiating deicing action.

19. The apparatus of claim 11 further comprising instructions to:
    control deployment angles of the side-view mirror based on the first rates of vehicle fuel consumption and the second rates of vehicle fuel consumption when the deployment states are incorrectly deployed.

20. The apparatus of claim 11 further comprising instructions to:
    determine one or more current-based deployment states for the side-view mirror; and
    control deployment states of the side-view mirror based on the first rates of vehicle fuel consumption, the second rates of vehicle fuel consumption and the current-based deployment states.

* * * * *